United States Patent [19]

Wong

[11] Patent Number: 5,055,552
[45] Date of Patent: Oct. 8, 1991

[54] POLYMERIZATION OF CO/OLEFIN WITH PHOSPHORUS BIDENTATE LIGAND-SOLID SUPPORT REACTION PRODUCT

[75] Inventor: Pui K. Wong, Katy, Tex.

[73] Assignee: Shell Oil Company, Houston, Tex.

[21] Appl. No.: 479,923

[22] Filed: Feb. 14, 1990

[30] Foreign Application Priority Data

Jun. 14, 1989 [NL] Netherlands ......................... 8901508

[51] Int. Cl.$^5$ ............................................. C08G 67/02
[52] U.S. Cl. .................................... 528/392; 502/162; 524/612; 525/123; 525/127; 525/292; 525/301; 525/539; 568/8; 568/17
[58] Field of Search ......................... 528/392; 524/612; 525/539, 123, 127, 292, 301

[56] References Cited

U.S. PATENT DOCUMENTS 3,694,412 9/1972 Nozaki ............................ 260/63 CQ
4,940,776 7/1990 Bakkum et al. .................... 528/392

FOREIGN PATENT DOCUMENTS 121965 10/1984 European Pat. Off. .
181014  5/1986 European Pat. Off. .
213671  3/1987 European Pat. Off. .
257663  3/1988 European Pat. Off. .

Primary Examiner—Harold D. Anderson

[57] ABSTRACT

An improved process for the production of linear alternating polymers of carbon monoxide and at least one ethylenically unsaturated hydrocarbon employs a novel catalyst composition formed from a compound of palladium, an anion of a strong non-hydrohalogenic acid and a supported bidentate ligand of phosphorus. The improved process is characterized by a reduced level of reactor fouling. The polymer products are useful as engineering thermoplastics.

12 Claims, No Drawings

POLYMERIZATION OF CO/OLEFIN WITH PHOSPHORUS BIDENTATE LIGAND-SOLID SUPPORT REACTION PRODUCT

FIELD OF THE INVENTION

The present invention relates to an improved process for the production of a linear alternating polymer of carbon monoxide and at least one ethylenically unsaturated hydrocarbon. More particularly, the invention relates to a process for the production of such polymers which employs a novel catalyst composition formed from, inter alia, a supported bidentate ligand of phosphorous. The invention also relates to certain novel precursors of the catalyst compositions.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. G.B. 1,081,304 produced compounds of higher carbon monoxide content in the presence of alkylphosphine complexes of palladium salts as catalysts. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of such linear alternating polymers, also known as polyketones or polyketone polymers, are illustrated by a number of published European Patent Applications including 121,965, 181,014, 213,671 and 257,663. The processes generally involve the use of a catalyst composition formed from a compound of palladium, cobalt or nickel, a strong non-hydrohalogenic acid and a bidentate ligand of phosphorus, arsenic, antimony or nitrogen. The scope of the polymerization process is extensive but, without wishing to be limited, a preferred catalyst composition is formed from a compound of palladium, a non-hydrohalogenic acid having a pKa below 2 and a bidentate ligand of phosphorus.

The polymerization process whereby the linear alternating polymers are produced will typically provide a polymeric product which is substantially insoluble in the media of its production. In this as in many if not most polymerization processes producing insoluble product, some degree of reactor fouling takes place. This problem is reduced by the conventional procedures such as polishing the internal surfaces of the reactor or coating the surfaces with materials such as Teflon ®. In copending U.S. patent application Ser. No. 338,246, filed Apr. 14, 1989, now U.S. 4,940,776 the degree of reactor fouling is reduced by incorporating in the reaction mixture a solid material including inorganic solids as well as preformed linear alternating polymer. It has also been proposed to add sulfonated polymeric solids to the reaction mixture as an acid component, e.g., U.S. patent application Ser. No. 908,899, filed Sept. 18, 1986, now U.S. 4,835,250 and other solids as a catalyst carrier for gas phase polymerization in U.S. patent application Ser. No. 053,780, filed May 26, 1987, now U.S. 4,778,876. It would be of advantage, however, to provide a polymerization process of producing linear alternating polymers whereby the extent of reactor fouling is reduced beyond that which would result from the mere presence of solid material in the polymerization mixture.

SUMMARY OF THE INVENTION

The present invention provides an improved process for the production of linear alternating polymers of carbon monoxide and at least one ethylenically unsaturated hydrocarbon which exhibits a reduced degree of reactor fouling. More particularly, the invention provides an improved process which employs a catalyst composition formed from, inter alia, a supported bidentate ligand of phosphorus. The invention further relates to novel bidentate ligands of phosphorus and to the novel catalyst compositions formed therefrom.

DESCRIPTION OF THE INVENTION

In the process of the invention there is employed a catalyst composition formed from a compound of palladium, a non-hydrohalogenic acid having a pKa below 2 and a supported bidentate ligand of phosphorus. The process provides an efficient method for the production of linear alternating polymers of carbon monoxide and at least one ethylenically unsaturated hydrocarbon in which a reduced degree of reactor fouling is observed.

The ethylenically unsaturated hydrocarbons which are useful as precursors of the polyketone polymers have up to 20 carbon atoms inclusive, preferably up to 10 carbon atoms inclusive, and are aliphatic including ethylene and other $\alpha$-olefins such as propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred linear alternating polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

The structure of the polyketone polymers is that of a linear alternating polymer and the polymer will contain substantially one molecule of carbon monoxide for each molecule of ethylenically unsaturated hydrocarbon. When the preferred terpolymers are produced there will be at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polyketone polymers is therefore represented by the repeating formula $$-CO-CH_2-CH_2)]_x[CO-G)]_y \qquad (I)$$

wherein G is a moiety of an ethylenically unsaturated hydrocarbon of at least 3 carbon atoms polymerized through the ethylenic unsaturation thereof and the ratio fo y:x is no more than about 0.5. When the preferred copolymers are produced there will be no second hydrocarbon present and the copolymers are represented by the above formula I where y is zero. When the preferred terpolymers are produced the —CO—CH$_2$C-

H₂— units and the —CO—G— units are found randomly throughout the polymer and the preferred ratio of y:x is from about 0.01 to about 0.1. The end groups or "caps" of the polymer will depend on what materials were present during the polymerization and whether and how the polymer has been purified. The precise properties of the polymer do not depend to any substantial extent upon the particular end groups, however, so that the polymer is fairly represented by the formula for the polymeric chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part on the molecular weight, whether the polymer is a copolymer or a terpolymer and, in the case of terpolymers, the nature of and the proportion of the second hydrocarbon present. Typical melting points for the polymers are from about 175° C. to about 300° C., particularly from about 210° C. to about 270° C. The polymers will have a limiting viscosity number (LVN), measured in a standard capillary viscosity measuring device in m-cresol at 60° C., of from about 0.5 dl/g to about 10 dl/g, preferably from about 0.8 dl/g to about 4 dl/g.

The catalyst composition to be utilized in the process of the invention is formed from a compound of palladium, an anion of a non-hydrohalogenic acid having a pKa (measured in water at 18° C.) below 2 and the supported bidentate ligand of phosphorus. The palladium compound precursor of the catalyst composition is preferably a palladium alkanoate and palladium acetate, palladium propionate, palladium hexanoate and palladium octanoate are satisfactory. Palladium acetate is particularly preferred. The anion to be employed is the anion of an inorganic acid such as sulfuric acid or perchloric acid or the anion of an organic acid such as a carboxylic acid, including trichloroacetic acid, dichloroacetic acid or trifluoroacetic acid, or a sulfonic acid such as methanesulfonic acid, trifluoromethanesulfonic acid or p-toluenesulfonic acid. The anions of trifluoroacetic acid and p-toluenesulfonic acid constitute a preferred class of anions from which the catalyst compositions of the invention are formed. The anion is preferably provided as the free acid but may alternatively be provided as a metal salt, particularly a non-noble transition metal salt such as the copper salt or the nickel salt. In yet another modification the anion and the palladium are provided as a single compound, e.g., palladium trifluoroacetate. However provided, the quantity of anion to be utilized is from about 1 mol to about 100 mols per mol of palladium. Preferably the quantity of anion should be from about 2 mols to about 50 mols of anion per mol of palladium.

The supported bidentate ligand of phosphorus is the reaction product of a solid support, organic or inorganic, containing a reactive group on the surface thereof which will react with a group, other than the phosphorus atoms, of the bidentate phosphorus ligand whose support is desired. A wide variety of such solid supports are satisfactory but preferred supports include supports having a) carbonyl groups, as illustrated by preformed linear alternating polymers of carbon monoxide and ethylenically unsaturated hydrocarbon, particularly linear alternating polymers of carbon monoxide and ethylene, b) hydroxyl groups such as silica, alumina and hydrogenated carbon monoxide/ethylenically unsaturated hydrocarbon polymers in which at least a portion of the carbonyl groups have been converted to hydroxyl, c) carboxylic acid groups such as copolymers of ethylene with acrylic acid or methacrylic acid, d) halogen groups such as chloromethyl-substituted polystyrenes and reaction products of silica with (2-chloroethyl)triethoxysilane, and e) isocyanate groups such as poly[methylene(polyphenylisocyanate)]. Such solid supports are known materials or are produced by known methods and a number of the supports are commercial. In part for reasons of convenience, the hydroxyl group-containing supports are particularly preferred, especially silica.

The bidentate ligands of phosphorus are ligands which contain, in addition to the two phosphorus atoms, a group which is reactive with the support on which the ligand is to be supported. Illustrative of such bidentate phosphorus ligands are ligands which contain i) hydroxyl groups such as 2-hydroxy-1,3-bis[di(2-methoxyphenyl)phosphino]propane, and ii) trialkoxysilyl groups such as the reaction product of 2-hydroxy-1,3-bis[di(2-methoxyphenyl)phosphino]propane with (3-isocyanatopropyl)triethoxysilane.

The ligands of type i) are novel materials but are produced by reaction of an alkali metal di(alkoxyphenyl)phosphide with epichlorohydrin. Preferred alkoxyphenylphosphides are those wherein each alkoxy has up to 4 carbon atoms and at least one alkoxy is located on a phenyl ring carbon atom ortho to the carbon atom through which the phenyl ring is connected to the phosphorus. Phosphides of lithium, sodium, potassium, rubidium or cesium are suitable although sodium di(alkoxyphenyl)phosphides are preferred. To form the hydroxy-substituted diphosphine, the appropriately substituted trialkoxyphosphine is reacted with alkali metal in liquid ammonia at reduced temperatures and the resulting phosphide is reacted with epichlorohydrin at moderate temperatures to produce the hydroxy-substituted diphosphine.

The preferred bidentate phosphorus ligands, however, are those of type ii) which are produced by reacting the 2-hydroxy-1,3-bis[di(alkoxyphenyl)phosphino]propane with an (isocyanatoalkyl)trialkoxysilane wherein each alkyl has up to 4 carbon atoms inclusive, e.g., (3-isocyanatopropyl)triethoxysilane.

The preferred supported bidentate phosphorus ligands are produced by reacting this silane-containing product with a hydroxyl-containing support such as silica. Whatever the particular nature of the supported bidentate phosphorus ligand, sufficient ligand is employed to provide from about 1 mol to about 10 mols of phosphorus per mol of palladium, preferably from about 2 mols to about 5 mols of phosphorus per mol of palladium.

It is useful on occasion, but not required, to enhance the activity of the catalyst composition by the inclusion in the mixture from which the catalyst composition is formed an amount of a quinone. The preferred quinones are 1,4-quinones and 1,4-benzoquinone, 1,4-naphthoquinone and 1,4-anthraquinone are satisfactory. The class of 1,4-benzoquinone and 1,4-naphthoquinone is preferred. The presence of quinone in the catalyst composition mixture is not required and amounts of quinone up to about 5000 mols of quinone per mol of palladium are suitable. When quinone is present, amounts of quinone from about 5 mols to about 1000 mols of quinone per mol of palladium are preferred.

The polymerization process is conducted by contacting in a suitable reactor the carbon monoxide and ethylenically unsaturated hydrocarbon reactants and a catalytic quantity of the catalyst composition in a liquid reaction diluent under polymerization conditions. Alkanol reaction diluents such as ethanol and methanol are satisfactory with methanol being preferred. Sufficient catalyst composition is employed to provide from about $1 \times 10^{-7}$ mole to about $1 \times 10^{-3}$ mole of palladium per mol of ethylenically unsaturated hydrocarbon to be polymerized. Preferred quantities of catalyst composition provide from about $1 \times 10^{-6}$ mole to about $1 \times 10^{-3}$ mol of palladium per mol of ethylenically unsaturated hydrocarbon to be polymerized. The molar ratio of carbon monoxide to ethylenically unsaturated hydrocarbon is from about 5:1 to about 1:10, preferably from about 2:1 to about 1:5. The polymerization conditions include a reaction temperature from about 40° C. to about 120° C. although reaction temperatures from about 50° C. to about 100° C. are more frequent. Typical reaction pressures are from about 20 bar to about 150 bar, preferably from about 30 bar to about 100 bar. The contact of reactants and catalyst composition is facilitated by the provision of conventional agitation means such as shaking or stirring. Subsequent to polymerization, the reaction is terminated as by cooling the reaction mixture and releasing the pressure.

The linear alternating polymer product is obtained as a material substantially insoluble in the medium of its production and is recovered by conventional methods such as filtration or decantation. The presence of small amounts of catalyst composition residue, including the ligand support, is not overly detrimental and in most instances the polymer is used as obtained. If desired, however, the polymer is purified by a solvent or complexing agent selective for the catalyst residues or by other conventional methods.

The polyketone polymers are thermoplastics of relatively high molecular weight and are useful as engineering thermoplastics. They are processed by methods conventionally employed with thermoplastics, such as extrusion, injection molding and thermoforming, into a wide variety of shaped articles of established utility. Specific applications include the production of containers for food and drink and the production of parts and housings for automotive applications. The improved process of the invention is characterized by a reduced degree of reactor fouling, thereby providing an enhanced efficiency of polymer production.

The invention is further illustrated by the following Comparative Examples (not of the invention) and the following Illustrative Embodiments which should not be regarded as limiting. The copolymer products of Comparative Example I and II and of Illustrative Embodiments IV, VI and VIII were examined by $^{13}$C-NMR analysis. Each copolymer was found to be linear with alternating moieties derived from carbon monoxide and ethylene.

COMPARATIVE EXAMPLE I

A copolymer of carbon monoxide and ethylene was produced by charging 180 ml of methanol to an autoclave of 300 ml capacity equipped with a mechanical stirrer. The contents of the autoclave were warmed to 90° C. and an equimolar mixture of carbon monoxide and ethylene was added until a pressure of 55 bar was reached. A catalyst composition solution was then added which comprised 24.5 ml methanol, 1.5 ml toluene, 0.01 mmol palladium acetate, 0.011 mmol 2-hydroxy-1,3-bis[di(2-methoxyphenyl)phosphino]propane, 0.2 mmol trifluoroacetic acid and 2.0 mmol 1,4-naphthoquinone. The pressure inside the autoclave was maintained by addition of an equimolar mixture of carbon monoxide and ethylene. After 4.98 hours the polymerization was terminated by cooling the reactor and contents to room temperature and releasing the pressure.

The resulting polymer suspension contained 4.98 g of copolymer and 19.90 g of copolymer remained on the internal surfaces of the autoclave. The reactor fouling was therefore calculated to be 80%. The rate of polymerization based on total copolymer was calculated to be 4.7 kg of copolymer/g Pd hr.

ILLUSTRATIVE EMBODIMENT I

The compound 2-hydroxy-1,3-bis[di(2-methoxyphenyl)phosphino]propane was produced in a reactor equipped with a mechanical stirrer. While the reactor was maintained at −45° C., a mixture of 101.2 g tri(methoxyphenyl)phosphine and 1100 ml of liquid ammonia and 13.1 g of sodium was introduced. After 4 hours, 15.3 g of ammonium chloride, 50 ml of tetrahydrofuran and a solution of 13.2 g of epichlorohydrin in 200 ml of tetrahydrofuran were sequentially added. The ammonia was then evaporated and the mixture was heated to 45° C. for 0.75 hour. The mixture was then cooled to 20° C. and 105 ml of water was added and an aqueous layer and a tetrahydrofuran layer were formed. The tetrahydrofuran layer was evaporated to remove solvent and methoxybenzene. The residue was extracted with dichloromethane and the solvent evaporated from the extract. The remaining white solid was washed with methanol and dried. The resulting product, 2-hydroxy-1,3-bis[di(2-methoxyphenyl)phosphino]propane was obtained in a 71% yield based on the tri(methoxyphenyl)phosphine.

ILLUSTRATIVE EMBODIMENT II

A supported phosphorus bidentate ligand was produced by refluxing for 12 hours a mixture of 5.49 g of 2-hydroxy-1,3-bis[di(2-methoxyphenyl)phosphino]propane prepared according to the procedure of Illustrative Embodiment I, 2.47 g of (3-isocyanatopropyl)triethoxysilane and 100 ml of p-xylene. After addition of 38.56 g of silica, the mixture was refluxed for an additional 12 hours. The resulting supported bidentate phosphorus ligand was recovered by filtration, washed with p-xylene and dried.

ILLUSTRATIVE EMBODIMENT III

A solid palladium/phosphorus bidentate ligand was produced by stirring for 16 hours at room temperature a mixture of 5.15 g of a supported phosphorus bidentate ligand prepared by the procedure of Illustrative Embodiment II, 37 g of palladium acetate and 50 ml of methanol. The resulting palladium/phosphorus bidentate ligand composition was recovered by filtration and dried. The composition contained 4.33 mg of palladium/g of composition.

ILLUSTRATIVE EMBODIMENT IV

A copolymer of carbon monoxide and ethylene was produced by charging to an autoclave of 300 ml capacity equipped with a mechanical stirrer 220 ml of methanol, 439 g of a palladium/phosphorus bidentate ligand prepared by the procedure of Illustrative Embodiment III and 0.039 mmol of trifluoroacetic acid. The contents of the autoclave were heated to 90° C. and an equimolar mixture of carbon monoxide and ethylene was added until a pressure of 55 bar was reached. The pressure within the autoclave was maintained by addition of the equimolar mixture. After 5.52 hours the polymerization was terminated by cooling the autoclave and contents to room temperature and releasing the pressure. The resulting polymer suspension contained 10.44 g of copolymer and 0.10 g of copolymer remained on the internal surfaces of the autoclave. The reactor fouling was 0.9% and the copolymer was obtained at the rate of 1.0 kg of copolymer/g Pd hr.

ILLUSTRATIVE EMBODIMENT V

A catalyst composition was produced by stirring for 16 hours at room temperature a mixture of 2 g of a supported phosphorus bidentate ligand prepared by the procedure of Illustrative Embodiment II, 166 mg of palladium trifluoroacetate and 25 ml of tetrahydrofuran. The resulting solid catalyst composition was recovered by filtration, washed with tetrahydrofuran and dried. The catalyst composition contained 12.5 mg of palladium/g of composition.

ILLUSTRATIVE EMBODIMENT VI

A copolymer of carbon monoxide and ethylene was produced by a procedure substantially similar to that of Illustrative Embodiment IV except that 154 mg of catalyst composition produced by the procedure of Illustrative Embodiment V was charged to the autoclave instead of the palladium/bidentate phosphorus ligand composition and trifluoroacetic acid, and the reaction time was 18.8 hours instead of 5.52 hours. The resulting polymer suspension contained 21.2 g of copolymer and 0.65 g of copolymer remained on the internal surfaces of the autoclave. The polymerization rate was 0.61 kg of copolymer/g Pd hr and the reactor fouling was 3%.

ILLUSTRATIVE EMBODIMENT VII

A catalyst composition was produced by a procedure substantially similar to that of Illustrative Embodiment V except that 112 mg of palladium acetate and 170 mg of trifluoroacetic acid were employed instead of palladium trifluoroacetate. The catalyst composition contained 13.5 g of palladium/g of composition.

ILLUSTRATIVE EMBODIMENT VIII

A copolymer of carbon monoxide and ethylene was produced by a procedure substantially similar to that of Illustrative Embodiment IV except that 64.5 g of a catalyst composition prepared by the procedure of Illustrative Embodiment VII was introduced into the autoclave instead of the palladium/phosphorus bidentate ligand composition and trifluoroacetic acid, and the reaction time was 24.2 hours instead of 5.52 hours. The resulting polymer suspension contained 9.3 g of copolymer and 0.2 g of copolymer remained on the internal surfaces of the autoclave. The reactor fouling was 2% and the polymerization rate was 0.39 kg of copolymer/g Pd hr.

COMPARATIVE EXAMPLE II

A copolymer of carbon monoxide and ethylene was produced by a procedure substantially similar to that of Comparative Example I except that the autoclave additionally contained 155 mg of the silica employed as a starting material in Illustrative Embodiment I but no 1,4-naphthoquinone, and the reaction time was 3.2 hours instead of 4.98 hours. The resulting polymer suspension contained 5.74 g of copolymer and 4.16 g of copolymer remained on the internal surfaces of the autoclave. The polymerization rate was 2.91 g of copolymer/g Pd hr and the reactor fouling was 42%.

What is claimed is:

1. In the process of producing a linear alternating polymer of carbon monoxide and at least one ethylenically unsaturated hydrocarbon by contacting the carbon monoxide and hydrocarbon under polymerization conditions in a liquid reaction diluent in the presence of a catalyst composition formed from a compound of palladium, an anion of a strong non-hydrohalogenic acid and a bidentate ligand of phosphorus, the improvement wherein the bidentate ligand is a solid, supported bidentate ligand which is a reaction product of a bidentate ligand of phosphorus and a solid support containing a reactive group on the surface of the support which will react with a group other than the phosphorus atoms of the bidentate ligand.

2. The process of claim 1 wherein the reactive group contained on the surface of the solid support is carbonyl, hydroxyl, carboxylic acid, halogen or isocyanate.

3. The process of claim 2 wherein the group other than the phosphorus atoms of the bidentate ligand which reacts with the reactive group on the surface of the support is a hydroxyl group or a trialkoxysilyl group.

4. The process of claim 1 wherein the bidentate ligand of phosphorus is produced by reacting a 1,3-bis[di(alkoxyphenyl)phosphino]propane with an (isocyanatoalkyl)trialkoxysilane.

5. The process of claim 4 wherein the bidentate ligand of phosphorus is produced by reacting a 2-hydroxy-1,3-bis[di(2-methoxyphenyl)phosphino]propane with (3-isocyanatopropyl)-triethoxysilane.

6. The process of claim 5 wherein the reactive group contained on the surface of the solid support is a hydroxyl group, and the solid support is silica.

7. In the process of producing a linear alternating polymer of carbon monoxide and ethylene by contacting the carbon monoxide and ethylene under polymerization conditions in a liquid reaction diluent in the presence of a catalyst composition formed from a compound of palladium, a strong non-hydrohalogenic acid and a bidentate ligand of phosphorus, the improvement wherein the bidentate ligand is a solid, supported bidentate ligand which is a reaction product of a bidentate ligand of phosphorus and a solid support containing a reactive group on the surface of the support which will react with a group other than the phosphorus atoms of the bidentate ligand.

8. The process of claim 7 wherein the reactive group contained on the surface of the solid support is carbonyl, hydroxyl, carboxylic acid, halogen or isocyanate.

9. The process of claim 8 wherein the group other than the phosphorus atoms of the bidentate ligand which reacts with the reactive group on the surface of the support is a hydroxyl group or a trialkoxysilyl group.

10. The process of claim 7 wherein the bidentate ligand of phosphorus is produced by reacting a 1,3-bis[- di(alkoxyphenyl)phosphino]propane with an (isocyanatoalkyl)trialkoxysilane.

11. The process of claim 10 wherein the bidentate ligand of phosphorus is produced by reacting a 2-hydroxy-1,3-bis[di(2-methoxyphenyl)phosphino]propane with (3-isocyanatopropyl)-triethoxysilane.

12. The process of claim 11 wherein the reactive group contained on the surface of the solid support is a hydroxyl group, and the solid support is silica.

* * * * *